United States Patent
Sim et al.

(10) Patent No.: US 8,054,225 B2
(45) Date of Patent: Nov. 8, 2011

(54) METHOD AND DEVICE FOR WIRELESS DIRECTIONAL BEAM-FORMING TRANSMISSION

(75) Inventors: Hong Cheng Michael Sim, Singapore (SG); Taisuke Matsumoto, Sunnyvale, CA (US); Hiroshi Doi, Osaka (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 12/297,626

(22) PCT Filed: Feb. 5, 2007

(86) PCT No.: PCT/SG2007/000038
§ 371 (c)(1),
(2), (4) Date: Dec. 2, 2008

(87) PCT Pub. No.: WO2007/123487
PCT Pub. Date: Nov. 1, 2007

(65) Prior Publication Data
US 2009/0135064 A1 May 28, 2009

(30) Foreign Application Priority Data

Apr. 20, 2006 (SG) .............................. 200602663-7

(51) Int. Cl.
*G01S 5/04* (2006.01)
*H04B 7/00* (2006.01)
(52) U.S. Cl. ...................................... 342/432; 342/367
(58) Field of Classification Search .................. 342/432, 342/367
See application file for complete search history.

(56) References Cited

U.S. PATENT DOCUMENTS
3,836,886 A * 9/1974 Mallinckrodt ................ 367/123
(Continued)

FOREIGN PATENT DOCUMENTS
WO     WO03007420 A1 *  1/2003

OTHER PUBLICATIONS

Choudhury et al., "On Designing MAC Protocols for Wireless Networks Using Directional Antennas", IEEE Transactions on Mobile Computing, vol. 5, No. 5, May 2006.*

(Continued)

*Primary Examiner* — Thomas Tarcza
*Assistant Examiner* — Frank McGue
(74) *Attorney, Agent, or Firm* — Dickinson Wright PLLC

(57) ABSTRACT

A method and device for wireless directional beam-forming transmission. The method for wireless directional beam-forming transmission between a first device and a second device comprises conducting one or more omni-directional transmissions between the first device and a third device; conducting one or more omni-directional transmissions between the second device and the third device; and determining directional information for directional beam forming transmissions between the first and second devices based on the omni-directional transmissions.

28 Claims, 12 Drawing Sheets

U.S. PATENT DOCUMENTS

| | | | |
|---|---|---|---|
| 4,613,863 A * | 9/1986 | Mitchell | 342/172 |
| 4,636,796 A * | 1/1987 | Imazeki | 342/443 |
| 5,146,231 A * | 9/1992 | Ghaem et al. | 342/419 |
| 6,301,238 B1 * | 10/2001 | Hagerman et al. | 370/336 |
| 6,345,188 B1 * | 2/2002 | Keskitalo et al. | 455/561 |
| 6,492,945 B2 * | 12/2002 | Counselman et al. | 342/464 |
| 6,608,593 B2 * | 8/2003 | Holt | 342/453 |
| 7,130,663 B2 * | 10/2006 | Guo | 455/562.1 |
| 7,158,078 B2 * | 1/2007 | Ninomiya et al. | 342/457 |
| 2001/0003443 A1 * | 6/2001 | Velazquez et al. | 342/367 |
| 2003/0108059 A1 * | 6/2003 | Yew et al. | 370/443 |
| 2003/0236096 A1 * | 12/2003 | Yamazaki | 455/456.6 |
| 2005/0243936 A1 * | 11/2005 | Agrawala et al. | 375/259 |
| 2009/0243930 A1 * | 10/2009 | Tien | 342/360 |

OTHER PUBLICATIONS

Weisstein, Eric W. "Normalized Vector", from Mathworld—A Wolfram Web Resource.*

Weisstein, Eric W. "Normal Vector", from Mathworld—A Wolfram Web Resource.*

Weisstein, Eric W. "Plane", from Mathworld—A Wolfram Web Resource.*

Weisstein, Eric W. "Triangle", from Mathworld—A Wolfram Web Resource.*

* cited by examiner

METHOD AND DEVICE FOR WIRELESS DIRECTIONAL BEAM-FORMING TRANSMISSION

FIELD OF INVENTION

The invention relates broadly to a method and device for wireless directional beam-forming transmission, a wireless communication device using the same, and a data storage medium having stored thereon code means for instructing a wireless communication device to execute a method for directional beam-forming transmission.

BACKGROUND

Current wireless communication methods typically employ the use of an omni-directional antenna in a device for transmitting and receiving data. When the device uses the omni-directional antenna to transmit a data packet into a wireless medium, the transmission is of a broadcast nature since the transmission is typically transmitted in equal strength in every direction. However, one problem with using the omni-directional antenna is that the antenna typically limits the range of the device. For example, in a star-topology network, slave devices may be assumed to be in omni-directional transmission range of a master device since they are associated with the master device but the peer slave devices may be unable to communicate directly with each other despite the fact that they are in the same network.

One method to overcome the range limitation is to increase the transmission power of the transmitting device such that the transmission may reach an intended receiving device that was originally out of range. One problem may arise since increasing the transmission power typically increases the power consumption of the transmitting device. This may be disadvantageous for a battery-powered device with limited power resources. Another problem that may arise with increasing transmission power to increase range is that increasing transmission power typically increases the interference range. In other words, there may be increased interference with potential communication between other devices that were originally out of range of the transmitting device.

Another method to overcome the range limitation is typically to use multi-hop communication to relay data packets. However, one problem that may arise when multi-hop communication is used is that performance typically suffers since latency between the transmitting device and receiver device typically increases when relaying data packets during multi-hop communication. Another problem that may arise when using multi-hop communication is that assistance is typically required of one or more relaying devices. This typically prevents the relaying devices from transmitting their own communication and also typically increases their overall power consumption when relaying is carried out. Yet another problem that may arise when using multi-hop communication is that having the same data packet transmitted and then relayed one or more times typically causes inefficiency as the wireless medium access resource may be consumed for transmissions of duplicated packets.

It has been recognised that another type of antenna that may be used for wireless transmission by a device is a directional antenna. When using the directional antenna, the transmission is typically "beam-formed" into a particular direction towards an intended receiver instead of a general transmission broadcast in every direction when using an omni-directional antenna. Thus, by using directional beam-forming, transmitting devices are typically able to extend their range towards intended receiver devices, thereby establishing direct communication without increasing transmission power or using intermediate devices for relaying data. The range is typically extended without increasing transmission power due to the fact that the transmission energy is concentrated toward a particular direction. Apart from beam-forming during transmission, the device may also beam-form in a particular direction during reception. Beam-forming in a particular direction during reception typically increases the gain of the receiver device in that particular direction and hence typically enhancing reception. In addition, multi-path interference arriving at the receiver device from the non-intended directions may be filtered away. This may increase the signal-to-noise ratio to improve reception.

Another advantage of using directional beam-forming is better spatial re-use of the wireless medium. Since receiver devices may beam-form their receivers in the direction of their respective intended sender devices, the respective transmissions are typically carried out without causing interference at neighbouring receiver devices. This may improve spatial reuse of the wireless medium since the neighbouring receiver devices typically do not require waiting for the beam-form transmissions to be completed before receiving their own data packets.

However, having discussed the above advantages of directional beam-forming over using an omni-directional antenna, one problem of using directional beam-forming is a "device deafness" issue. The deafness issue typically refers to a situation when a device appears to be "deaf" and does not respond to any incoming communication packet. This may occur when the reception antenna of the receiving device is beam-formed in an intended direction of a transmitting device. Thus, the receiving device is typically unable to receive other transmissions sent from other devices disposed in other directions. When no response or acknowledgement packets are received from the receiving device in relation to these other transmissions, the other devices are typically unable to determine whether the receiving device is busy or whether the transmitted communication packets have not reached the receiving device. The other devices typically continue re-sending the communication packets thus not utilising fully the wireless medium access resource. In the above event, the receiving device which is not responsive to incoming communication packets, other than those transmitted from its intended transmitting device, is termed as "suffering" from "device deafness".

Another problem that may arise when using directional beam-forming is how a transmitting device determines the direction of an intended receiving device. The problem also applies to how a receiving device determines the direction of the transmitting device to beam-form its receiver. Although there are currently some solutions to address the above problem, further problems may arise with each of these solutions. One of these solutions is to assume prior knowledge of the relative directions of the receiving device and of the transmitting sender device. One problem that may arise from this assumption is that mobile devices typically move and rotate on a frequent basis. Therefore, the prior knowledge may become obsolete and typically requires constant updating.

Another of the above solutions is to use an external positioning device (e.g. a Global Positioning System or GPS device) or to use the capability of the transmitting/sending device to perform real-time ranging and location-positioning measurements. However, one problem that may arise is that external positioning devices are typically expensive. As for real-time ranging and location positioning measurements, distance calibration is typically required to be performed by the device and the calibration is typically both time- and power-consuming.

Yet another of the above solutions is to use the transmitting device to first use an omni-directional transmission of control signals to reserve the wireless medium access time for subsequent communication using directional beam-forming with the intended receiving device. As the control signals are sent via the omni-directional transmission, the transmitting device typically need not know the direction of the intended receiver in advance. The receiving device typically determines the direction of the transmitting device from the control signals sent via the omni-directional transmission using a Direction-of-Arrival (DOA) calculation and responds to the transmission using either a directional beam-forming or an omni-directional transmission. The transmitting device typically determines the relative direction of the receiving device using the DOA calculation based on the received response transmission. One problem that may arise is range limitation. As the medium access time reservation and relative direction calculations are typically initiated by the omni-directional transmission of the transmitting device, the receiving device must already be located within the omni-directional transmission range of the transmitting device. Thus, the range extension advantage of directional beam-forming is not harnessed and the above scenario does not address the situation of devices not being able to communicate with other devices outside their respective omni-directional transmission range.

Yet another of the above solutions is for the transmitting device to utilise directional beam-forming to transmit a control signal to reserve the wireless medium access time for subsequent communication with its intended receiving device. As the transmitting device typically has no prior knowledge of the relative direction of the intended receiving device, the transmitting device transmits the control signal in a rotational manner such that the directional beam-forming transmission covers an entire 360°. However, one problem that may arise is that the sending of multiple duplicated control packets in the above manner is typically inefficient and typically degrades performance of the devices.

Hence, there exdsts a need for a method and system of wireless directional beam-forming transmission to address at least one of the above problems.

SUMMARY

In accordance with a first aspect of the present invention, there is provided a method of wireless directional beam-forming transmission between a first device and a second device, the method comprising conducting one or more omni-directional transmissions between the first device and a third device; conducting one or more omnidirectional transmissions between the second device and the third device; and determining directional information for directional beam-forming transmissions between the first and second devices based on the omni-directional transmissions.

In accordance with a second aspect of the present invention, there is provided a wireless communication device comprising: a transmitter for transmitting one or more omni-directional transmissions to an intermediate device; a receiver for receiving directional information from the intermediate device for directional beam forming transmissions to a destination device; and a processor for generating additional directional information based on the received directional information, wherein the transmitter conducts directional beam-forming transmission to the destination device based on the directional information received from the intermediate device and the additional directional information.

In accordance with a third aspect of the present invention, there is provided a wireless communication device comprising: a receiver for receiving one or more omni-directional transmissions from a source device and a destination device; a transmitter for transmitting one or more omni-directional transmissions to the source device and the destination device; and a processor for generating directional information for directional beam forming transmissions between the source and the destination device based on omni-directional transmissions received by the receiver, wherein the transmitter transmits the directional information to the source and the destination devices using one or more omni-directional transmissions.

In accordance with a fourth aspect of the present invention, there is provided a data storage medium having stored thereon code means for instructing a wireless communication device to execute a method for directional beam-forming transmission, the method comprising the steps of: transmitting one or more omni-directional transmissions to an intermediate device; receiving directional information from the intermediate device for directional beam forming transmissions to a destination device; generating additional directional information based on the received directional information; and conducting directional beam-forming transmission to the destination device based on the directional information received from the intermediate device and the additional directional information.

In accordance with a fifth aspect of the present invention, there is provided a data storage medium having stored thereon code means for instructing a wireless communication device to execute a method for directional beam-forming transmission, the method comprising the steps of receiving one or more omni-directional transmissions from a source device; transmitting one or more omni-directional transmissions to a destination device; receiving one or more omni-directional transmissions from the destination device; generating directional information for directional beam forming transmissions between the source and the destination device; and transmitting the directional information to the source and the destination devices using one or more omni-directional transmissions.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

In the description below, an example embodiment is first broadly described followed by a more detailed description of the example embodiment.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "conducting", "calculating", "determining", "providing", "generating", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the description, a star-topology network is provided for description purposes. However, it would be appreciated by a person skilled in the art that the scope of the invention is not limited to star-topology networks. For example, in a distributed or ad-hoc network, the common neighbour device may be any device in omni-directional range of both the source device and the destination device.

Figure 1:
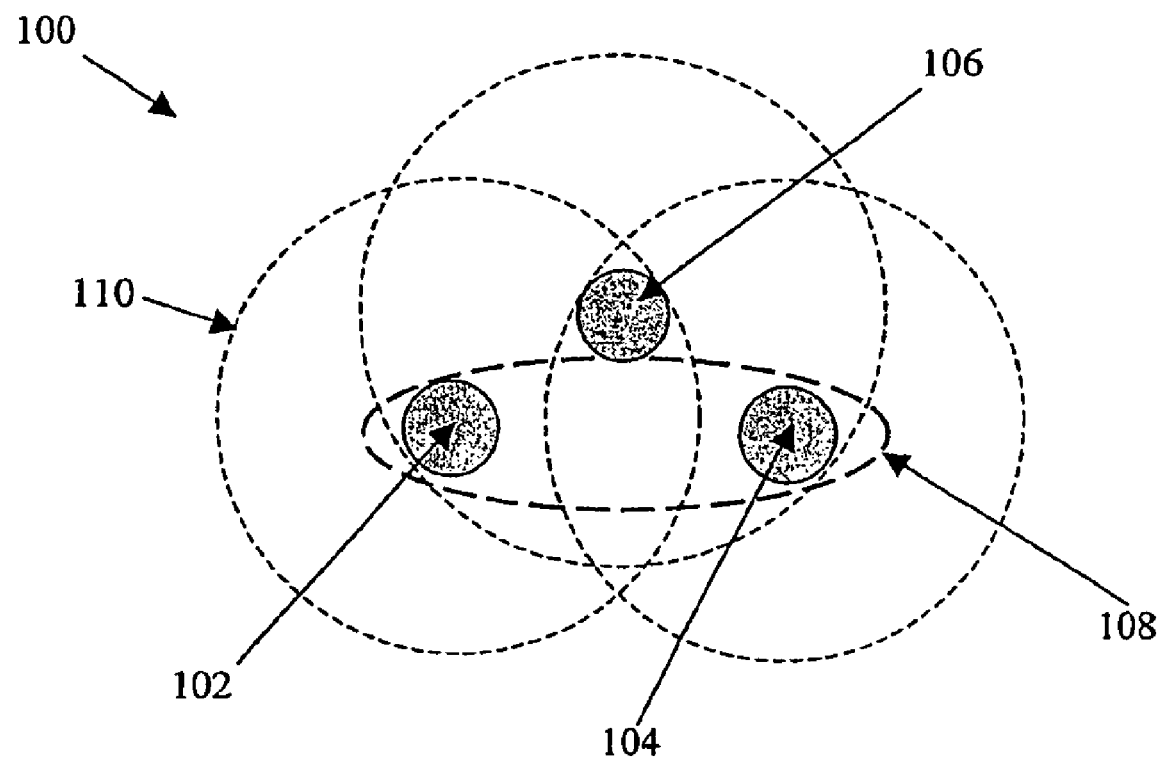
FIG. 1 is a schematic diagram of a star-topology network.

FIG. 1 is a schematic diagram of the star-topology network 100. The network comprises a source device 102, a destination device 104 and a common neighbour device 106. The source device 102 is a device that initiates a reservation of the wireless medium access time for directional beam-forming communication with the destination device 104. The common neighbour device 106 is a device that is within the omni-directional range of both the source device 102 and the destination device 104. The destination device 104 is in directional beam-forming range (indicated by numeral 108) of the source device 102 but out of the omni-directional range (indicated by numeral 110) of the source device 102. Based on the star-topology network 100, a typical master device may be adopted as the common neighbour device 106 while the source and destination devices 102 and 104 respectively may be the slave devices associated with and, each in omni-directional communication range of the master device 106.

In the current arrangement, the medium access time is partitioned such that the source device 102 may reserve medium access time to communicate directly with the destination device 104 using directional beam-forming.

Figure 2:
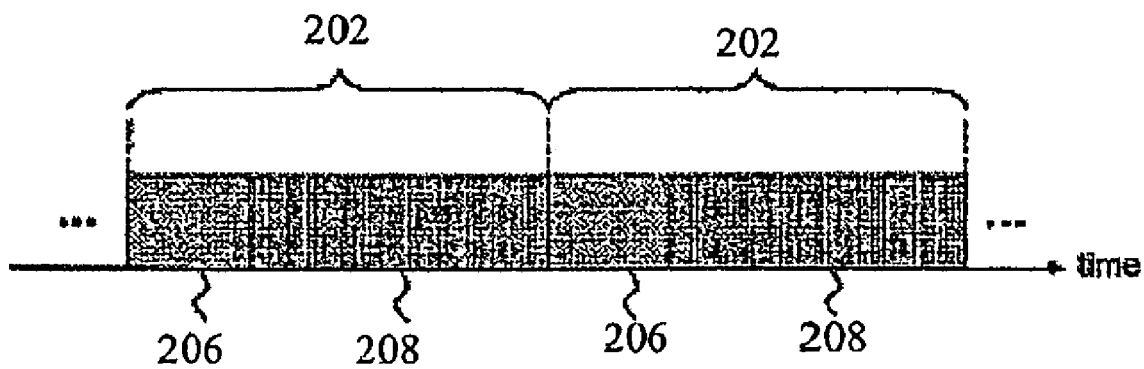
FIG. 2 is a schematic illustration of the medium access time partitioning.

FIG. 2 is a schematic illustration of the medium access time partitioning. The medium access time is partitioned into periodic partitions or superframes 202, 204. Within each superframe 202, 204, the medium access time is further partitioned into an omni-directional period 206 and a reservation period 208. The omni-directional period 206 is used for omni-directional transmission by devices 102, 104, 106 (FIG. 1). Control packets transmitted using omni-directional transmissions are transmitted within the omni-directional period 206. The medium access-time in the reservation period 208 is available for reservation by the devices 102, 104, 106 (FIG. 1) for data communication. The reservation may either be for communication using directional beam-forming or for communication using omni-directional transmission.

Returning to FIG. 1, to initiate wireless medium reservation for communication using directional beam-forming, the source device 102 first uses an omni-directional transmission during the omni-directional period 206 to inform the common neighbour device 106 of a reservation request in the reservation period 208. The common neighbour device 106 communicates this reservation request to the intended destination device 104 via an omni-directional transmission. Therefore, the source device 102 communicates indirectly with the destination device 104 through the common neighbour device 106. The destination device 104 responds to the common neighbour device 106 via an omni-directional transmission, indicating whether or not the reservation request is accepted. Based on the omni-directional transmissions transmitted to and from the common neighbour device 106, the common neighbour device 106 determines the relative direction of the source device 102 and the destination device 104 from its own position. In addition, the common neighbour device 106 determines the relative direction of the destination device 104 from the source device 102 and the relative direction of the source device 102 from the destination device 104.

The determination of the above direction information includes calculating the ratio of the received transmission power at the common neighbour device 106 from the source device 102 and from the destination device 104. It would be appreciated by a person skilled in the art that absolute distance of the source device 102 and the destination device 104 from the common neighbour device 106 is not required. Therefore, any range or position measurement that requires any distance calibration is not required. Details of the determination of the direction information will be described in more detail below.

After determining the various relative direction information, the common neighbour device 106 transmits the relative direction information to the source device 102 and the destination device 104. After transmitting the relative direction information, assuming that the communication request has been accepted by the destination device 104, the common neighbour device 106 broadcasts the ongoing reservation of the medium access time using a broadcast packet.

When the reserved medium access time is used for communication, the source device 102 and the destination device 104 align their reference directions and directional antennae toward each other using the transmitted relative direction information received from the common neighbour device 106. The source device 102 transmits a control packet to the destination device 104 using directional beam-forming to confirm the medium access time reservation. The destination device 104 responds by transmitting a response packet to the source device 102. Therefore, the source device 102 and the destination device 104 communicate directly with each other using directional beam-forming. The source device 102 (or the destination device 104) then Informs the common neighbour device 106 of whether or not the reservation confirmation is successful by transmitting a control packet via an omni-directional transmission.

If the reservation confirmation is successful, the common neighbour device 106 continues to announce periodically the medium access time reservation. Otherwise, the common neighbour device 106 stops announcing the medium access time reservation. If the reservation confirmation is successful, the source device 102 and the destination device 104 communicate directly with each other during the reserved medium access time using directional beam-forming.

Based on the announcement of the medium access time reservation by the common neighbour device 106, other devices within range of the common neighbour device 106 are aware of the reservation and may reduce "deafness" occurrences as mentioned in the Background section. In other words, as the source device 102 and the destination device 104 are communicating using directional beam-forming, the source device 102 and the destination device 104 may not respond to other communication packets sent to them by these other devices. Since these other devices are aware of the above directional beam-forming communication, the unresponsiveness of the source device 102 and/or the destination device 104 is expected and not attributed to "deafness". These other devices may then delay transmitting communication packets to the source device 102 and/or the destination device 104 until the beam-forming communication is completed. In this description, the "deafness" problem may be solved since every slave device in a star-topology network is in omni-directional range of the master device.

It would be appreciated that the omni-directional broadcast of the medium access time reservation is not limited to the master device. For example, the broadcast may be alternatively or additionally transmitted by the source device, the destination device, or both.

Figure 3:
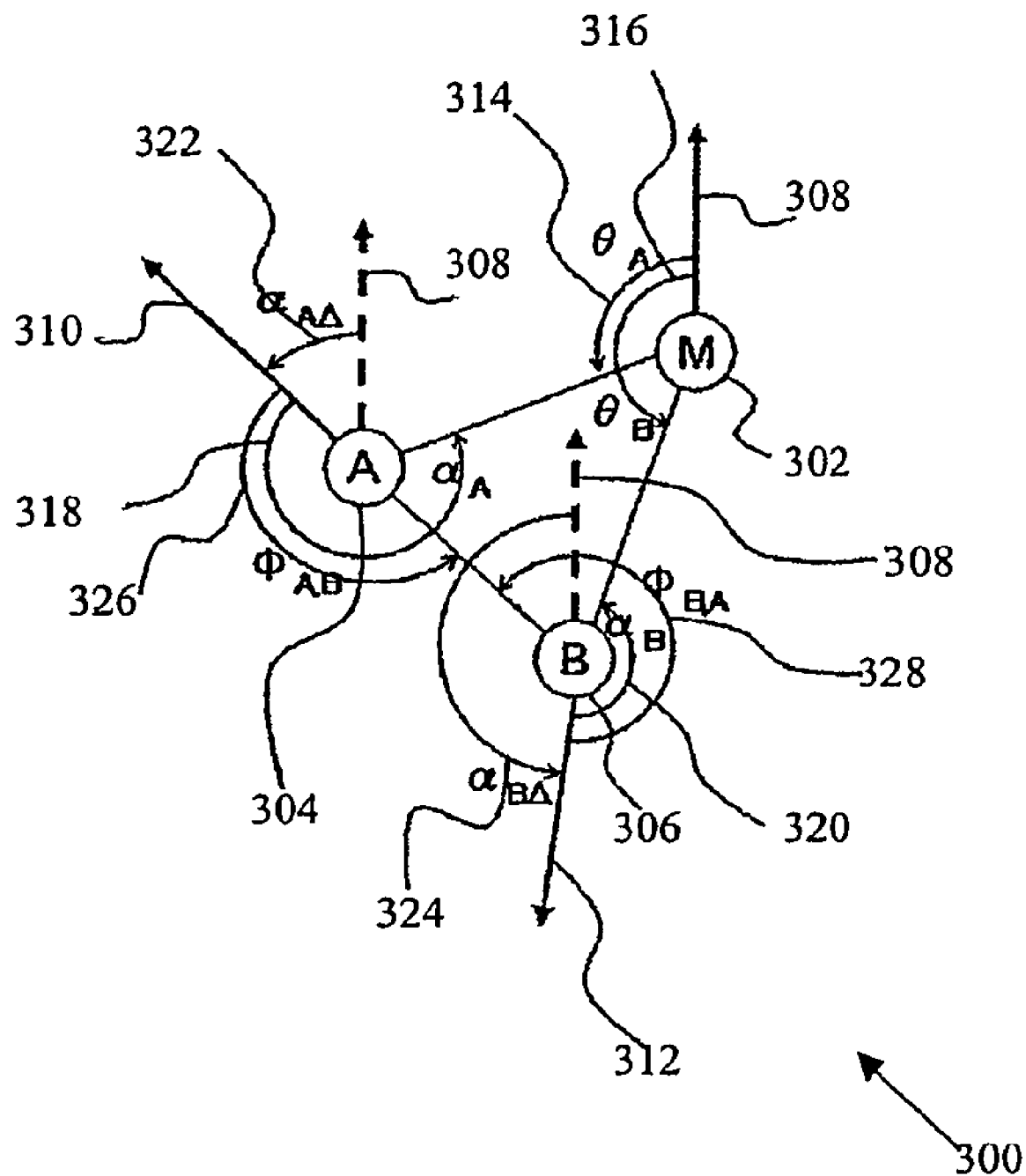
FIG. 3 is a schematic diagram of another star-topology network.

Following the general overview above, the current arrangement is described in more detail below. FIG. 3 is a schematic diagram of a star-topology network 300. A master device 302 is the master of the network 300 and slave devices A 304 and B 306 are associated to the network 300. It is assumed that every device in the network 300 has a reference direction which each device measures direction from. The reference direction 308 of the master device 302 is as indicated in FIG. 3. The reference directions 310 and 312 of slave devices A 304 and B 306 respectively are as indicated in FIG. 3. It is assumed that there is no prior knowledge of the directions and positions of the devices 302, 304, 306 in the network 300.

Based on this assumption, the reference directions 310 and 312 are not synchronized with the reference direction 308 of the master device 302.

In the current arrangement, the angles are measured in radians and are measured in a counter-clockwise direction from the reference direction of each device. Angles $\theta_A$ 314 and $\theta_B$ 316 represent the respective directions of the device A 304 and the device B 306 as determined from the reference direction 308 of the master device 302. Angles $\alpha_A$ 318 and $\alpha_B$ 320 represent the direction of the master device 302 determined from the respective reference directions 310 and 312 of the device A 304 and the device B 306. Angle $\alpha_{AA}$ 322 represents the angular difference between the reference direction 310 of the device A 304 and the reference direction 308 of the master device 302. Angle $\Delta_{BA}$ 324 represents the angular difference between the reference direction 312 of the device B 306 and the reference direction 308 of the master device 302. Angles $\alpha_{AA}$ 322 and $\Delta_{BA}$ 324 are measured with respect to the reference direction 308. Angle $\Phi_{A,B}$ 326 represents the direction of the device B 306 as determined from the reference direction 310 of the device A 304 while angle $\Phi_{B,A}$ 328 represents the direction of the device A 304 as determined from the reference direction 312 of the device B 306.

Figure 4:
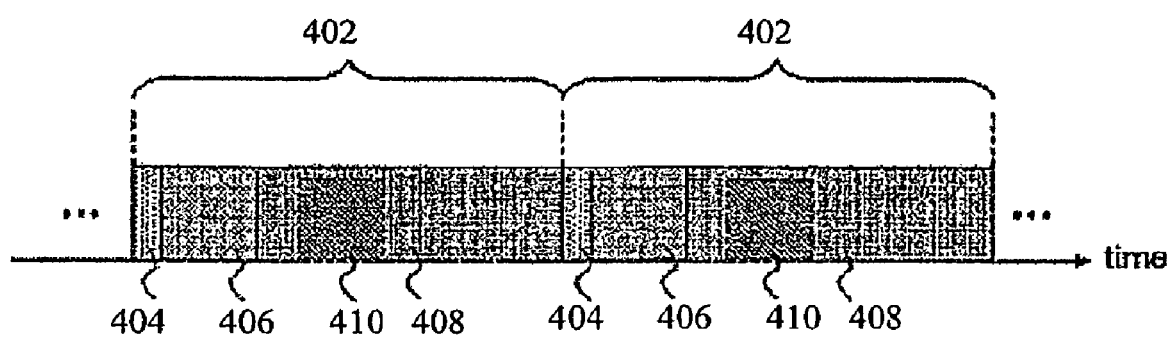
FIG. 4 is a schematic illustration of medium access time partitioning by a master device of the star-topology network in FIG. 3.

FIG. 4 is a schematic illustration of medium access time partitioning by the master device 302 (FIG. 3). The master device 302 (FIG. 3) partitions the medium access time into periodic superframes e.g. 402. Each superframe e.g. 402 is further partitioned into a Beacon Period (BP) 404, a Control Period (CP) 406 and a Reservation Period (RP) 408. The BP 404 is reserved for the master device 302 (FIG. 3) to broadcast at least one beacon frame using omni-directional transmission. The CP 406 is used by the devices in the network 300 (FIG. 3) for omni-directional transmission of any control packets or data packets. The medium access time in the CP 406 is subject to contention by the devices in the network 300 (FIG. 3). The medium access time in the RP 408 may be allocated by any device in the network 300 (FIG. 3) for communication (either using omni-directional transmission or directional beam-forming) without any contention. A target medium access block 410 is a period in the RP 408 to be reserved by devices in this description for communication.

Figure 5:
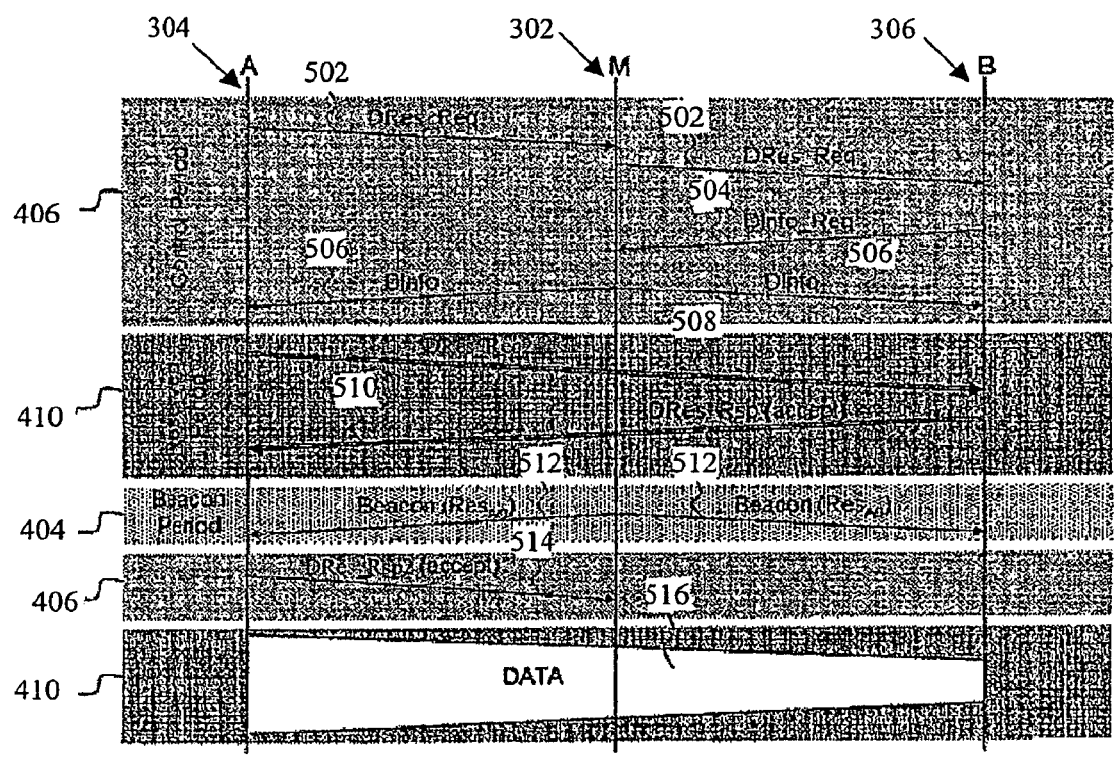
FIG. 5 is a schematic diagram illustrating the communication process between the master device and two other devices in FIG. 3.

FIG. 5 is a schematic diagram illustrating the communication process between the master device 302, the device A 304 and the device B 306. In the following description, reference is jointly made to components of FIG. 3, FIG. 4, FIG. 5 and FIG. 6.

Device A 304 initiates the reservation process by sending a notification packet, called a "Directional Reservation Request" (DRes_Req) packet 502, to the master device 302 to request reservation of medium access time in the RP 408 to communicate with device B 306 using directional beam-forming. The DRes_Req packet 502 is transmitted to the master device 302 using an omni-directional transmission in the CP 406. The master device 302 may carry out decision procedures to decide whether or not the reservation request is accepted. The implementation of the decision procedures is beyond the scope of this invention.

Assuming that the reservation request is accepted, the master device 302 notifies the intended target device B 306 of the reservation request using an omni-directional transmission in the CP 406 to forward the DRes_Req packet 502. After receiving the forwarded DRes_Req packet 502, the device B 306 responds to the master device 302 using an omni-directional transmission in the CP 406, indicating whether or not the reservation request of device A 304 is accepted. Assuming that the reservation request is accepted, the device B 306 transmits a "Directional Information Request" (DInfo_Req) packet 504 to the master device 302.

At this stage, the master device 302 has received communication packets sent via omni-directional transmissions from both device A 304 and device B 306. The master device 302 has adequate information to calculate the angles (e.g. $\theta_A$ 314, $\theta_B$ 316, $\Phi_{A,B}$ 326 and $\Phi_{B,A}$ 328 of FIG. 3).

Figure 6:
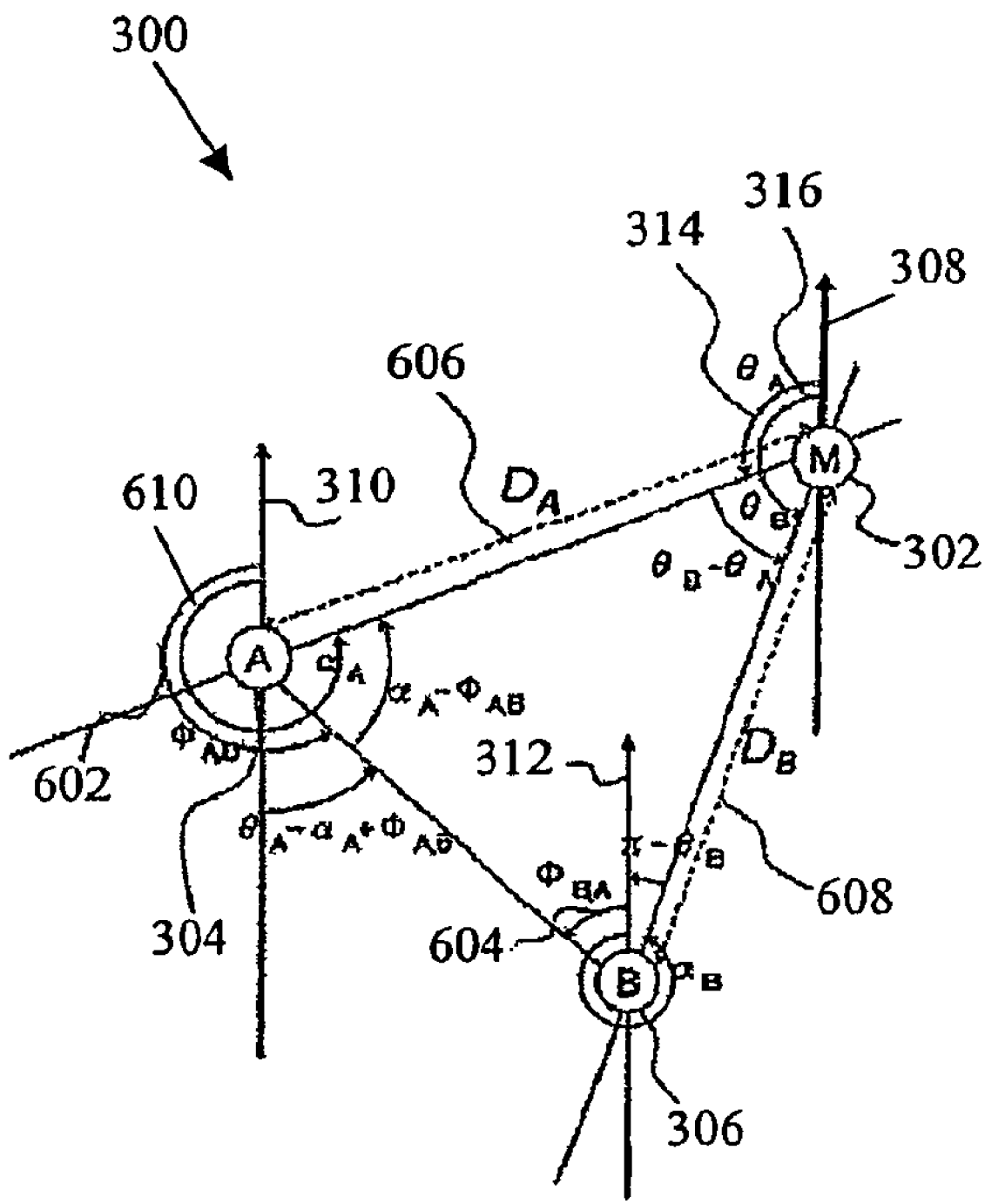
FIG. 6 is a schematic diagram of the star-topology network in FIG. 3 illustrating how angles in FIG. 3 are calculated.

To describe how the angles $\theta_A$ 314, $\theta_B$ 316, $\Phi_{A,B}$ 326 and $\Phi_{B,A}$ 328 of FIG. 3 are calculated, reference is made to FIG. 6. FIG. 6 is another schematic diagram of the network 300. As the angles $\theta_A$ 314, $\theta_B$ 316, $\Phi_{A,B}$ 602 and $\Phi_{B,A}$ 604 are calculated by the master device 302, it will be appreciated by a person skilled in the art that the angles $\theta_A$ 314, $\theta_B$ 316, $\Phi_{A,B}$ 602 and $\Phi_{B,A}$ 604 are calculated based on the reference direction 308 of the master device 302. Therefore, in this current arrangement, $$\Phi_{A,B}602 = \Phi_{A,B}326 + \Delta_{AA}322 \quad (1)$$

$$\Phi_{B,A}604 = 2\pi - \Phi_{B,A}328 - \Delta_{BA}324 \quad (2)$$

The angles $\Phi_{A,B}$ 602 and $\Phi_{B,A}$ 604 are utilised by the device A 304 and device B 306 respectively to beam-form towards each other after aligning their respective reference directions 310 and 312 to the reference direction 308 of the master device 302. The alignment process of the device A 304 and device B 306 are based on the angles $\theta_A$ 314 and $\theta_B$ 316 respectively.

In relation to calculating $\theta_A$ 314 and $\theta_B$ 316, using a Direction of Arrival (DOA) algorithm or any other physical layer algorithms, the master device 302 calculates the angles $\theta_A$ 314 and $\theta_B$ 316 based on the DRes_Req packet 502 (FIG. 5) received from the device A 304 and the DInfo_Req packet 504 (FIG. 5) received from the device B 306 respectively. The above algorithms are beyond the scope of the invention.

In relation to describing the calculation of $\Phi_{A,B}$ 602 and $\Phi_{B,A}$ 604, FIG. 6 illustrates the reference directions 310 and 312 as aligned to the reference direction 308 for description purposes only since the angles $\Phi_{A,B}$ 602 and $\Phi_{B,A}$ 604 are initially calculated with respect to the reference direction 308 of the master device 302.

$D_A$ 606 and $D_B$ 608 are the respective distances of device A 304 and device B 306 from the master device 302. A variable r, as a ratio of $D_A$ 606 to $D_B$ 608, is expressed as $$r = \frac{D_A}{B_B} \quad (3)$$

The angles $\Phi_{A,B}$ 602 and $\Phi_{B,A}$ 604 are calculated with respect to r, $\theta_B$ 316 and $\alpha_A$ 610 where $$\alpha_A = 2\pi - (\pi - \theta_A) = \pi + \theta_A \quad (4)$$

Using trigonometric identities, the relationship of $\phi_{A,B}$ 602 with $\alpha_A$ 610, $\theta_B$ 316 and r is expressed as $$\Phi_{A,B} = \tan^{-1}\left\{\frac{r\sin\alpha_A + \sin\theta_B}{\cos\theta_B + r\cos\alpha_A}\right\} \quad (5)$$

$\Phi_{B,A}$ 328 is derived from $\Phi_{A,B}$ 326 and is expressed as $$\Phi_{B,A} = \Phi_{A,B} - \pi \quad (6)$$

Therefore, as $\alpha_A$ 610 and $\theta_B$ 316 are known values, $\Phi_{A,B}$ 602 and $\Phi_{B,A}$ 604 are determined after calculating r.

It would be appreciated by a person skilled in the art that there are various methods to calculate r. Two such methods are described below.

One method to calculate r is the master device 302 compares the received signal strength from the communication packets transmitted from the device A 304 and device B 306. During the reservation process described previously, from the received DRes_Req packet 502 (FIG. 5) and DInfo_Req packet 504 (FIG. 5) respectively, the master device 302 determines the received power or signal strength of these received packets 502 (FIG. 5) and 504 (FIG. 5).

Let $P_A$ and $P_B$ denote the power of the received packets 502 (FIG. 5) and 504 (FIG. 5) respectively. Depending on the wireless channel model or other implementation specific assumptions, a relationship between the received power and the distance of the device where the transmission is from is established. In this description, the normal free space propagation path loss model is used for establishing the relationship.

In free space propagation, the received power $P_r$ and transmitted power $P_t$ are typically related by the equation $$P_r = P_t \left[\frac{\lambda_C}{4\pi d}\right]^2 G_t G_r \quad (7)$$

where $\lambda_c$ is the wavelength, $G_t$ and $G_r$ are the power gains of the transmitting and receiving antennae respectively, and d is the range separation. Therefore, according to equation (7), the received power $P_r$ is inversely proportional to the square of the range separation d. Using the relationship in equation (7), r may be expressed as $$r = \sqrt{\frac{P_A}{P_B}} \quad (8)$$

Therefore, one method of determining r is to utilise the power of the received packets 502 (FIG. 5) and 504 (FIG. 5).

Another method of calculating r is by comparing the transmission delay between transmission time to reception time. The value of r may be determined by first calculating the transmission delay for the DRes_Req packet 502 (FIG. 5) transmitted from the device A 304 to reach the master device 302 and calculating the transmission delay for the DInfo_Req packet 504 (FIG. 5) transmitted from the device B 306 to reach the master device 302. The transmission delays are determined based on transmitreceive timing information included in the DRes_Req packet 502 (FIG. 5) and the DInfo_Req packet 504 (FIG. 5) respectively. A ratio between the above two transmission delays is then calculated. As the transmission delays are appreciated to be directly proportional to transmission distances, the above ratio of the transmission delays provides a relatively good estimate of r.

Based on the above description, it would be appreciated by a person skilled in the art that the absolute values of $D_A$ 606 and $D_B$ 608 are not required to calculate $\Phi_{A,B}$ 602 and $\Phi_{B,A}$ 604. Instead, the variable r (e.g. from equation (8)) is sufficient to calculate $\Phi_{A,B}$ 602 and $\Phi_{B,A}$ 604. Therefore, the devices do not require additional ranging devices to calibrate and measure distance.

After determining the angles $\theta_A$ 314, $\theta_B$ 316, $\Phi_{A,B}$ 602 and $\Phi_{B,A}$ 604, the master device 302 proceeds to transmit information comprising the angles $\theta_A$ 314, $\theta_B$ 316, $\Phi_{A,B}$ 602 and $\Phi_{B,A}$ 604 to device A 304 and device B 306 using an omni-directional transmission to broadcast a "Directional Information" (DInfo) packet 506 (FIG. 5) in the CP 406 (FIG. 5).

Based on the $\theta_A$ 314 and $\theta_B$ 316 information received in the DInfo packet 506, the device A 304 and device B 306 align their reference directions 310 and 312 respectively to the reference direction 308 of the master device 302. The alignment process allows the device A 304 and device B 306 to beam-form towards each other based on the received angles $\Phi_{A,B}$ 602 and $\Phi_{B,A}$ 604 respectively.

Figure 7:
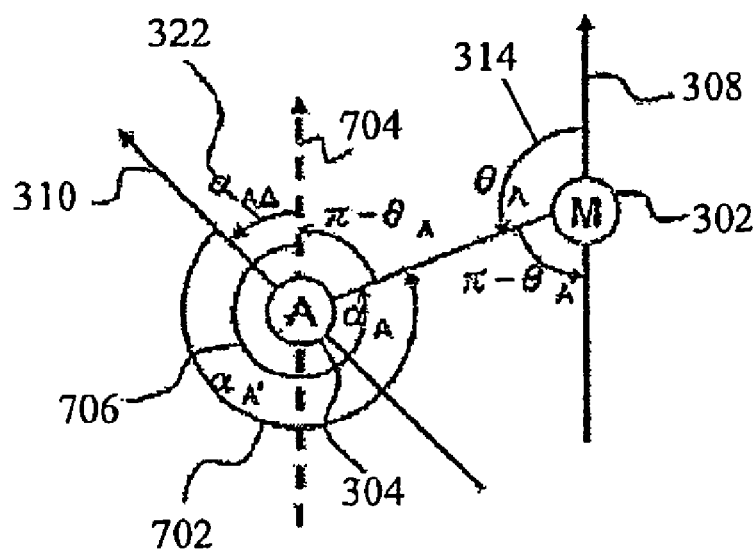
FIG. 7 is a schematic diagram illustrating how one device in FIG. 3 aligns its reference direction to the reference direction of the master device in FIG. 3.

For describing the alignment process, reference is made to FIG. 7. FIG. 7 is a schematic diagram of a section of FIG. 3 illustrating how the device A 304 calculates $\alpha_{A\Delta}$ 322 and aligns its reference direction 310 to the reference direction 308 of the master device 302 based on $\alpha_{A\Delta}$ 322.

When the device A 304 receives the DInfo packet 506 (FIG. 5) broadcast by the master device 302, it receives the information of $\theta_A$ 314 from the master device 302. In addition, the device A 304 determines the direction (indicated by a $\Delta_A$, 702) the DInfo packet 506 (FIG. 5) is sent from, using techniques such as the DOA algorithm or any other physical layer algorithms. Using geometry techniques, the angle $\alpha_{A\Delta}$ 322 is expressed as $$\alpha_{A\Delta}+\Delta_A+\pi-\theta_A=2\pi$$

or $$\alpha_{A\Delta}=\pi+\theta_A-\alpha_{A'} \quad (9)$$

Based on the calculated $\alpha_{A\Delta}$ 322, device A 304 proceeds to adjust the reference direction 310 by that offset $\alpha_{A\Delta}$ 322 so that it is aligned with the reference direction 308 of the master device 302. The final aligned reference direction is indicated by numeral 704. The final $\alpha_A$ 706 of the master device 302, from the perspective of device A 304, based on the aligned reference direction 704 is determined based on $$\alpha_{A\Delta}=\alpha_A+\pi\theta_A=2\pi$$

or $$\alpha_{A\Delta}=\pi+\theta_A-\alpha_{A'} \quad (10)$$

The $\alpha_A$ 706 is used by device A 304 to determine whether or not its reference direction 310 is correctly aligned to the reference direction 308 of the master device 302. This determination is carried out by device A 304 comparing $\alpha_A$ 706 against the direction (indicated by $\alpha_{A'}$ 702) the DInfo packet 506 (FIG. 5) is sent from.

It will be appreciated by a person skilled in the art that using the same method described above, device B 306 aligns its reference direction 312 to the reference direction 316 of the master device 302 based on $\alpha_{B\Delta}$ 324.

After aligning their respective reference directions 310 and 312, the device A 304 and device B 306 directionally beam-form toward each other based on the angles information of $\Phi_{A,B}$ 602 (FIG. 6) and $\Phi_{B,A}$ 604 (FIG. 6) respectively.

In order to describe the communication process after the devices A 304 and B 306 are beam-formed towards each other, reference is made back to FIG. 5. After beam-forming towards each other, the device A 304 and the device B 306 communicate directly during the RP 408 to confirm the medium access time reservation requested by the device A 304. The device A 304 transmits a reservation request (DRes_Req2) packet 508 using a directional beam-forming transmission in the direction of the device B 306. The DRes_Req2 packet 508 is transmitted during the start of the target medium access block 410. After receiving the DRes_Req2 packet 508, the device B 306 either accepts or rejects the reservation request by transmitting a response (DRes_Rsp) packet 510 using a directional beam-forming transmission in the direction of the device A 304.

In the meantime, the master device 302, after broadcasting the DInfo packet 506, proceeds to indicate in its periodic beacon frame broadcast 512 in the BP 404 that the targeted medium access block 410 is being reserved for directional beam-forming communication between the device A 304 and device B 306. The beacon frame broadcast 512 indicates additional status information comprising information to inform other devices in the network that the reservation of the targeted medium access block 410 is pending confirmation between the device A 304 and the device B 306.

Returning to the DRes_Rsp 510 packet transmitted by the device B 306, after the reservation confirmation is completed, either the transmitting device A 304 (which is initiating communication) or the receiving device B 306 (which is the target device of device A 304) informs the master device 302 of the status of the reservation confirmation via an omni-directidnal transmission in the CP 406. In this arrangement, device A 304 informs the master device 302 that the reservation request is confirmed by transmitting a "Directional Reservation Response" (DRes_Rsp2) packet 514. On one hand, the device A 304 and the device B 306 proceed to carry out directional beam-forming communication 516 in the reserved medium access block 410. On the other hand, if the reservation confirmation is successful, the master device 302 continues to broadcast the reservation information of the medium access block 410 in its beacon frames 512 to notify other devices in the network of the reservation. If the reservation confirmation is unsuccessful as communicated by the DRes_Rsp2 514 packet, the master device 302 stops broadcasting the reservation of the medium access block 410 in its beacon frames 512.

In the current arrangement, during confirmation of the reservation, the range extension of directional beam-forming may be exploited by allowing the two devices to communicate even though the devices are not in omni-directional antenna range. In addition, by switching the antennae to the required beam-form angle, any potential interference from concurrent omni- or directional beam-forming transmissions may be detected. Thus, spatial reuse of the reservation period using directional beam-forming communication may be facilitated.

Furthermore, the omni-directional transmission may be prevented from interfering with medium access time reserved for directional beam-forming by partitioning the medium access time such that there is at least a period allocated for each device to reserve for communicating using directional beam-forming. In addition, at least a period of medium access time for omni-directional transmission by any device is partitioned so that as devices switch their antennae to omni-directional mode during this period, the devices are able to receive incoming reservation requests even if the devices have ongoing directional beam-forming reservations in the reservation period. This may reduce "device deafness". Also, as the re-alignment of reference directions is performed during reservation, devices may conserve operating power since directional information synchronization or calculation is not constantly performed. In addition, as the incident angle and signal power of the received packets are used in calculations and direction determination, range or location calibration and measure may not be required.

The technique described above uses a 2-D model in calculations and assumes communicating devices (i.e., a transmitter slave device and a destination slave device to by on a substantially horizontal plane. For devices that are situated at different height in 3-D space, the calculation of using the 2-D model has limitations in accuracy. This is explained using an example shown in FIG. 8.

Figure 8:
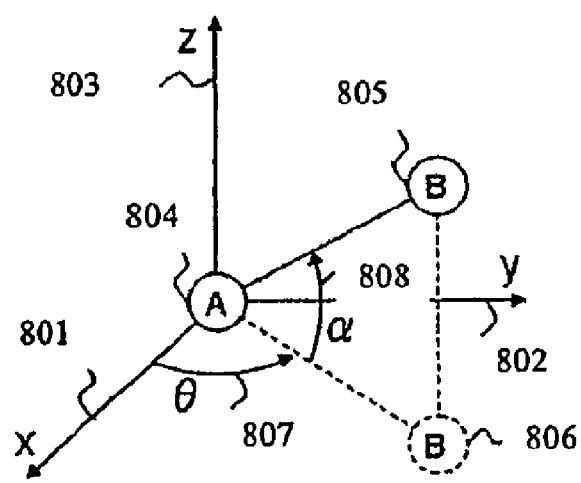
FIG. 8 is a schematic diagram illustrating a limitation in identifying a device position for wireless communication devices in 3-D space based on the 2-D model of FIG. 6.

In FIG. 8, device B 805 is located above the horizontal plane X-Y of device A 804 in a Cartesian space X-Y-Z. If a 2-D model of X-Y plane is considered, device B's position will be mistaken to be at B' 806 in the horizontal plane X-Y of device A 804, which is a vertical projection of B 805 down (–Z direction) on the X-Y plane. In this' case, only the azimuth angle θ 807 of device B 805 with respect to device A 804 is considered while the angle of elevation α 808 for device B 805 is neglected. Consequently, the erroneous position B' 806 is taken for a directional antenna based communication for the device A 804 according to the 2-D model and it can cause problems for establishing reliable communication between A 804 and B 805 in a 3-D star-topology network.

Figure 9:
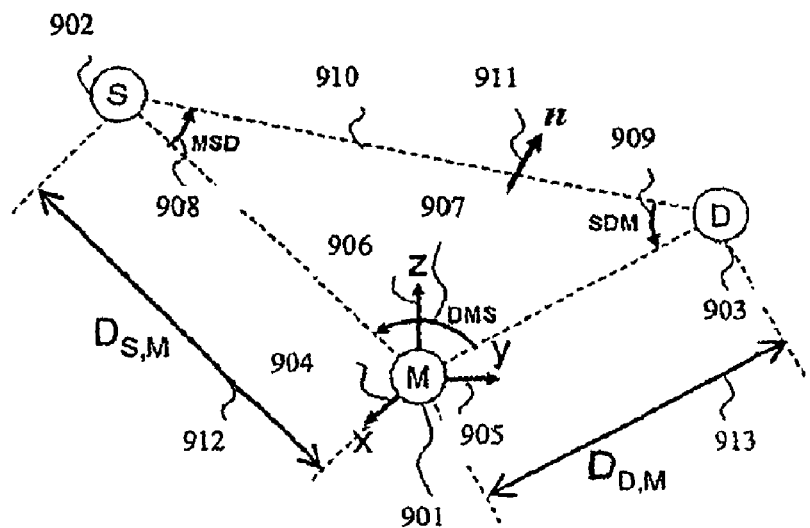
FIG. 9 shows a simplified network for determining directions and distance ratios for directional antennas based communication in another example.

Referring to FIG. 9, a star-topology network in an alternative embodiment is used for illustration. In FIG. 9, device M 901 is the master device of the network. Source device S 902 and destination device D 903 are associated with the master device M 901 forming the network. Each device in the network measures fellow devices' 3-D coordinates with respect to itself in the network, such as the angles and distances. The Cartesian coordinates (X, Y and Z) of the master device M 905 are represented by 904, 905 and 906 respectively. At an initial stage, the three devices 901, 902, 903 are not synchronised for wireless communication using directional antennas since they do not have the information each other's respective positions in the network.

Figure 10:
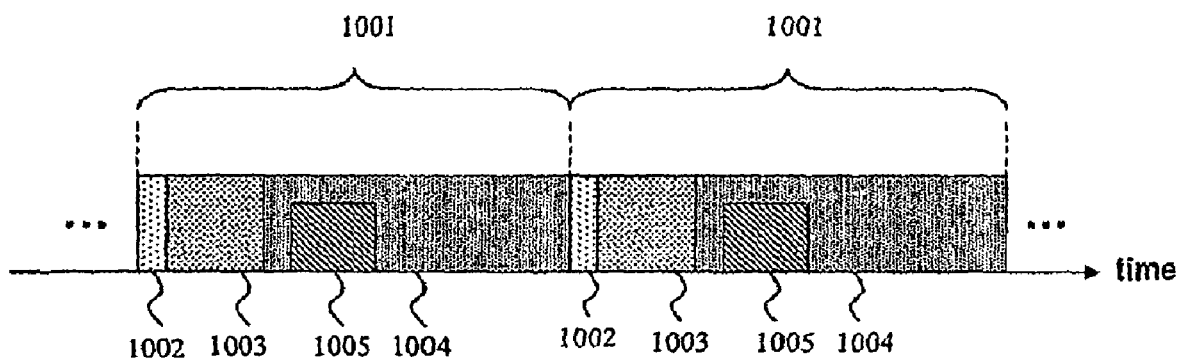
FIG. 10 shows a medium access time partitioning example comprising super-frames with a beacon period, a control period and a directional period.

To synchronise the devices 901, 902, 903 of the network shown in FIG. 9, medium access times for communication between the devices 901, 902, 903 is determined according to the scheme shown in FIG. 10. In FIG. 10, the medium access time of the master device 901 is partitioned into super-frames 1001. Each super-frame is further partitioned into a Beacon Period (BP), a Control Period (CP) and a Reservation Period (RP), which are represented by 1002, 1003 and 1004 respectively. The BP 1002 is reserved for the master device to broadcast beacon frames using an omni-directional transmission antenna. The CP 1008 is used by all devices 901, 902, 903 in the network for omni-directional transmission of control packets or data packets. The medium access time in the CP 1003 is subject to contention by all devices 901, 902, 903. The medium access time in the RP 1004 is allocated by any device for exclusive communication (either using omni-directional or directional beam-forming technique) without any contention.

To communicate with device D 903, device S 902 needs to reserve a block of medium access time 1005 in the RP 1004 for directional beam-forming communication with device D 903 first. However, device S 902 and D 903 do not know 3-D reference coordinates of the master device M 901 prior to this reservation since they are not synchronised at this stage. In other words, 3-D reference coordinates (X, Y, Z) of device S 902 and D 903 are not aligned with the master device M's 901 X 904, Y 905, Z 906 coordinates respectively.

Figure 11:
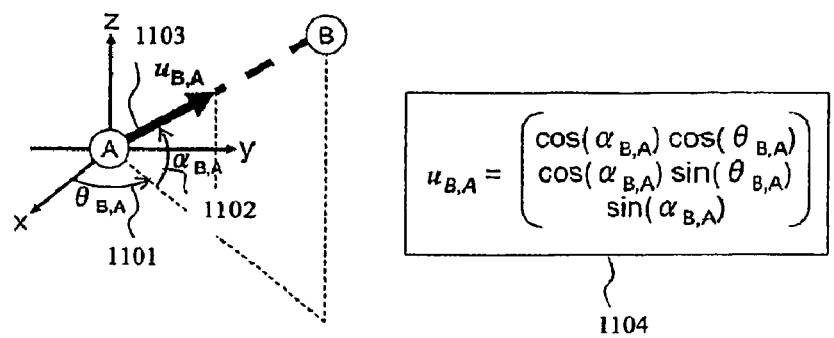
FIG. 11 shows the notations used to represent azimuth and elevation angles in 3-D space.

For illustration, some notations are introduced for determining the reference coordinates of each device with reference to FIG. 11:

1. $\theta_{B,A}$ 1101 is the azimuth angle of a device B 805 seen from device A 804 and the azimuth angle is measured on X-Y plane in a counter-clockwise direction about Z-axis;
2. $\alpha_{B,A}$ 1102 is the elevation angle from the X-Y plane of device B 805 seen from device A 804; and
3. $u_{B,A}$ 1103 is the unit direction vector from device A 804 toward the direction of device B 805.

$\theta_{B,A}$ and $\alpha_{B,A}$ are determined by using known Directional-Of-Arrival (DOA) algorithm to detect the azimuth and elevation angle of an incoming packet. The unit direction vector $u_{B,A}$ 1103 is calculated based on measured $\theta_{B,A}$ and $\alpha_{B,A}$ according to equation 11.

$$u_{B,A} = \begin{vmatrix} \cos(\alpha_{B,A}) & \cos(\theta_{B,A}) \\ \cos(\alpha_{B,A}) & \sin(\theta_{B,A}) \\ & \sin(a_{B,A}) \end{vmatrix} \quad (11)$$

Figure 12:
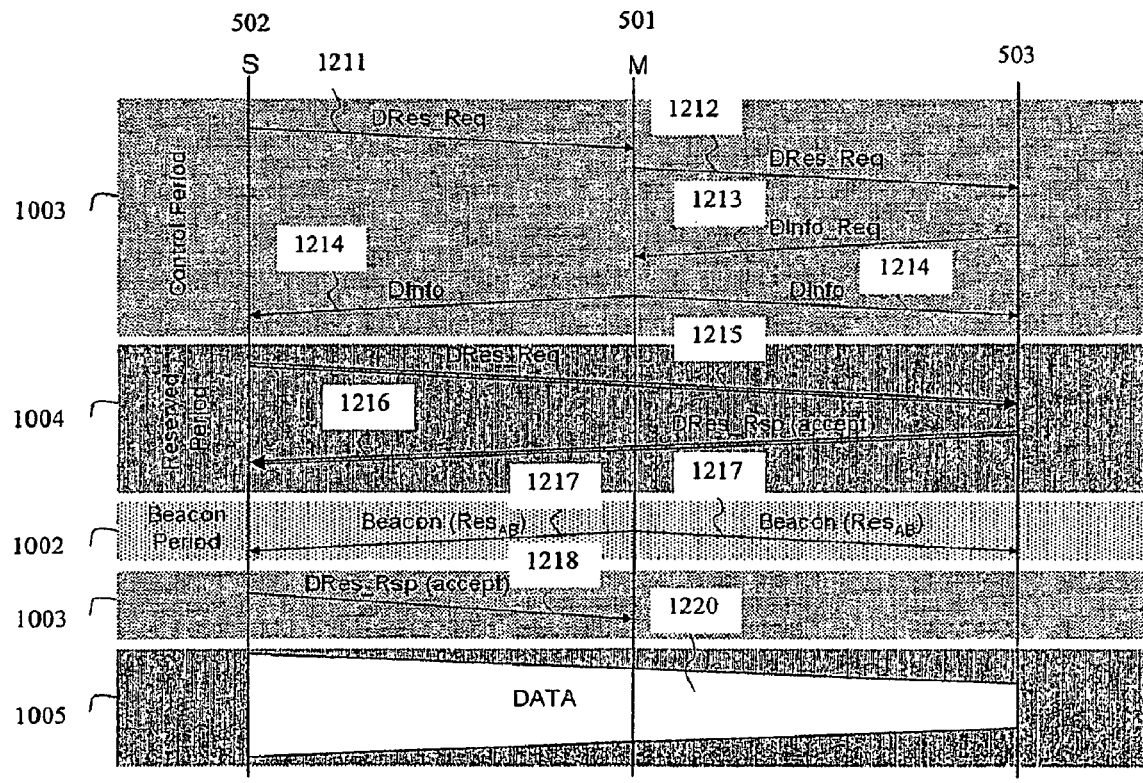
FIG. 12 shows a sequence of handshake communication for a successful medium access time reservation for wireless communication.

The reservation procedure for medium access time is explained with reference to FIG. 12. In FIG. 12, three parallel vertical lines represent devices S 1202, M 1201 and D 1203 of FIG. 9 spaced at a distance from each other. A stack of horizontally parallel shaded bars cascade down representing a control period 1003, a reserved period 1004, a beacon period 1002 sequentially, which correspond to medium access time partitioning according to the scheme of FIG. 10. The communication steps between respective devices S 902, M 901 and D 903 are indicated by arrows with labels attached for data packets transmission.

The first step 1211 of the medium time reservation procedure is executed by sending a notification to master device M 901 by device S 902 that device S 902 wishes to reserve medium access time in the RP 1004 to communicate with device D 903 using directional beam-forming. This step 1211 is labelled at Dres_Req, which is known as Directional Reservation Request. This notification packet (labelled as Dres_Req) is transmitted to M 901 using omni-direction transmission in the CP 1003. Accordingly, master device M 901 carries out some decision procedures to decide whether it can grant this reservation request. If this request is granted, the master device M 901 notifies the intended target device D 903 of the reservation request using omni-directional transmission in the CP 1003 by forwarding the DRes_Req packet, which is the second step 1212. After receiving the forwarded reservation notification (DRes_Req packet), device D 903 responds to master device M 901 using omni-directional transmission in CP 1003, indicating whether it accepts or rejects the reservation intention. Here, device D 903 accepts the reservation as the third step 1213 by sending a "Directional Information Request" (DInfo_Req) packet back to the master device M 901.

Figure 13:
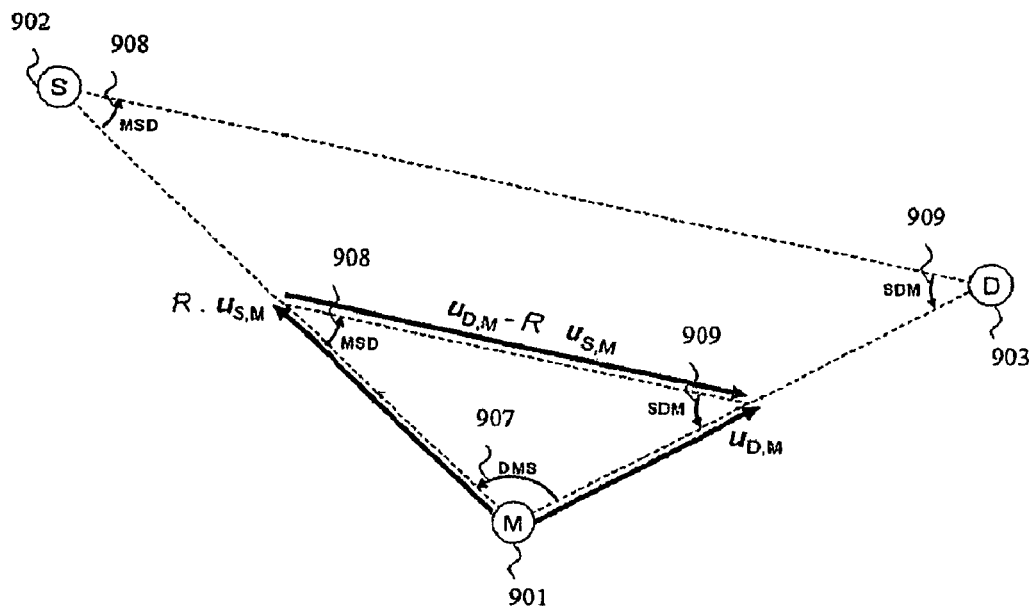
FIG. 13 shows a diagram used to calculate mutual angles between devices in a simplified network, including a source device, a destination device and a master device.

At this moment, the master device M 901 has already received data packets sent omni-directionally from both device S 902 and D 903. The master device M 901 thus has enough information to make the necessary calculations on angles and vectors according to a DOA algorithm and equation 11. Referring to FIG. 13, angles and vectors that need to be determined by the master device M 901 are:

1. Azimuth angle $\theta_{S,M}$ and elevation angle $\alpha_{S,M}$ of source device S 902;
2. Azimuth angle $\theta_{D,M}$ and elevation angle $\alpha_{D,M}$ of source device D 903;
3. Unit direction vector ($u_{S,M}$) from device M 901 towards device S 902;
4. Unit direction vector ($u_{D,M}$) from device M towards device D 903;
5. Normalized normal vector n of the plane in which device S 902, D 903 and M 901 resides; and
6. Angles ∠DMS 907, ∠MSD 908 and ∠SDM 909.

Azimuth angles and elevation angles of device S 902 and D 903 are calculated by using a known DOA algorithm. It will be appreciated by a person skilled in the art that there are numerous existing Direction of Arrival (DOA) (or sometimes called Angle of Arrival (AoA)) algorithms that may be used. One example is "Direction of Arrival Estimation with a Novel Single-Port Smart Antenna" by Chen Sun and Nemai C. Karmakar, *EURASIP Journal on Applied Signal Processing, Special issue: Advances in Smart antennas*, vol. 2004, no. 9, pp. 1364-1375, August 2004. The unit direction vectors $u_{S,M}$ and $u_{D,M}$ are calculated from the obtained azimuth and elevation angles using equation 11. The normalised (normal) vector n, of the plane containing S 902, D 903, M 901 is calculated using the cross product of direction vectors $u_{S,M}$ and $u_{D,M}$ according to equation 12.

$$n = \frac{u_{S,M} \times u_{D,M}}{|u_{S,M} \times u_{D,M}|} \quad (12)$$

Angle ∠DMS (507) is calculated using dot product of the unit direction vectors $u_{S,M}$ and $u_{D,M}$ according to equation 13:

$$\angle DMS = \cos^{-1}(u_{S,M}, u_{D,M}) \quad (13)$$

To further obtain the angles ∠MSD and ∠SDM, the ratio R of the distance $D_{S,M}$ between S 902 and M 901 over the distance $D_{D,M}$ between D 903 and M 901 need to be calculated. This is expressed in equation 14:

$$R = D_{S,M}/D_{D,M} \quad (14)$$

There are a number of ways to obtain the value of R. One way is to have the master device M 901 compare the received signal strength from the packets received from device S 902 and D 903. Let $P_A$ and $P_B$ denote the power of the received packet 1211 and 1213 respectively. Depending on wireless channel model or other specific implementations, relationship between the received power and distance the transmission can be established accordingly. In this embodiment, the normal free space propagation path loss model is used. In free space propagation, the received power $P_r$ and transmitted power $P_t$ are related according to equation 15 where $\lambda_c$ is the wavelength of packets carrying radio waves, $G_t$ and $G_r$ are the power gains of the transmitting and receiving antennas respectively, and d is the range separation (distance) between the transmitting and receiving antennas.

$$P_r = P_t \left(\frac{\lambda_c}{4\pi d}\right)^2 G_t G_r \quad (15)$$

In order words, the received power $P_r$ is inversely proportional to the square of the range separation d (the distance between two communicating devices). Therefore, the received power of device D 903 and S 902 can be calculated according to equation 16:

$$P_{Sr} = P_{Mt} \left(\frac{\lambda_c}{4\pi d}\right)^2 G_{Mt} G_{Sr} \quad (16)$$

$$P_{Dr} = P_{Mt} \left(\frac{\lambda_c}{4\pi d}\right)^2 G_{Mt} G_{Dr} \quad (17)$$

Using this information, R the ratio of $D_{S,M}$ 912 over $D_{D,M}$ 913 can be expressed as given by equation 18:

$$R = \sqrt{\frac{P_{Sr}}{P_{Dr}}} \quad (18)$$

An alternative method for calculating R is by comparing transmission delay from transmission time to reception time. In this case the value of R can be determined by calculating the transmission delay for packet (Dres_Req) from device S 902 to the master device M 901, the transmission delay for packet (DInfo_Req) from device D 903 to the master device M 901, and the ratio between these the two transmission delays. Since the transmission delays are directly proportional to transmission distances, this calculation gives a good estimate of R. In the above-mentioned methods, the absolute value of $D_{S,M}$ 912 and $D_{D,M}$ 913 are not required which enables devices 901, 902, 903 in the network to communicate between each other using directional and omni-directional antennas without being equipped with ranging devices for calibrating and measuring distance. As result, the cost of building the network is brought down.

Referring to FIG. 13 again, unit vectors of the network are expressed, which are $u_{D,M}$ [from D 903 to M 901], $u_{S,M}$ [from S 902 to M 901] and $u_{S,D}$ [from S 902 to D 903]. The angles of ∠MSD and ∠SDM are calculated in a similar manner to ∠DMS according to equation 19 and 20.

$$\angle MSD = \cos^{-1}\left[\frac{(-Ru_{S,M}) \cdot (u_{S,D})}{|(-Ru_{S,M})| \cdot |u_{S,D}|}\right] \quad (19)$$

$$\angle SDM = \cos^{-1}\left[\frac{(-u_{S,D}) \cdot (-u_{D,M})}{|(-u_{S,D})| \cdot |(-u_{D,M})|}\right] \quad (20)$$

In the equations 19 and 20, the unit vector from D 903 to S 902 can be calculated following equation 21:

$$u_{S,D} = u_{D,M} - Ru_{S,M} \quad (21)$$

Returning to FIG. 12, after determining the above angles and vectors, the master device 901 proceeds to disseminate information on angles and vectors to device S 902 and D 903 using omni-directional transmission. The fourth step 1214 is to broadcast directional information packet (DInfo) to fellow devices in the network including S 902 and D 903, which operates, within GP 1003.

Using the DInfo packet received, device S 902 applies a DOA algorithm to determine azimuth and elevation angles of M 901 with respect to S 902, which are $\theta_{M,S}$ and $\alpha_{M,S}$. In a similar way, device D 903 determines azimuth and elevation angles of M 901 with respect to D 903, which are $\theta_{M,D}$ and $\alpha_{M,D}$. With these determined azimuth and elevation angles of M 901 and their perceived angle from device M's point of reference ($\theta_{S,M}$ and $\alpha_{S,M}$) and ($\theta_{D,M}$ and $\alpha_{D,M}$) respectively, device S 902 and D 903 proceed to synchronize their 3-D coordinates to align with device M's 901 coordinates.

For device S 902 to synchronize its 3-D coordinates with device M's 901 coordinates, device S 902 performs the following steps:

1. Setting new X-axis in direction of $(-\theta_{M,S}, -\alpha_{M,S})$
2. Rotating new X-axis about Y-axis by $(-\alpha_{S,M})$
3. Rotating new X-axis about Z-axis by $(-\theta_{S,M})$ to arrive at the synchronized X-axis; and
4. Arranging Y and Z axes based one the set X-axis.

Device D 903 follows similar steps as above but using different angles:

1. Setting new X-axis in direction of $(-\theta_{M,D}, -\alpha_{M,D})$
2. Rotating new X-axis about y-axis by $(\alpha\alpha_{D,M})$
3. Rotating new X-axis about z-axis by $(-\theta_{D,M})$ to arrive at the synchronized X-axis and
4. Arranging Y and Z axes based one the set X-axis.

After aligning the 3-D coordinates with devices M 901, S 902 and D 903, the devices 901, 902, 903 make use of the previously obtained angle information ∠MSD, ∠SDM and normal vector n to determine mutual directions. The direction from S 902 to D 903 is opposite to the direction from D 903 to S 902, which is 180-degree turn around n. Consequently, as the fifth step, devices S 902 beam-forms a data reservation request packet (Dres_Req) 1215 towards device D 903. In return, as the sixth step, device D 903 accepts the request and sends a data reservation response packet [Dres_Rsp (accept)] back to device S 902 by beam-forming. Both the fifth and sixth steps operate within RP 1004 to confirm the medium access time reservation.

For sending DInfo packet 1214 to S 902 and D 903, as the seventh step 1217, the master device 901 broadcasts in its periodic beacon frame [Beacon (Res$_{AB}$)] that the medium access block 1005 is reserved for directional beam-forming communication between device S 902 and D 903. Optionally, the master device 901 may indicate further status information. For example, the master device 901 informs other devices that the reservation is currently pending confirmation between device S 902 and D 903.

After the reservation confirmation is completed, as the eighth step 1218, either the transmitter device S 902 or the target device D 903 informs the master device the status of the reservation confirmation using omni-directional transmission in CP 1003. In this embodiment, device S 902 informs the master device M 901 that the reservation is confirmed successfully using a Directional Reservation Response packet. As the ninth step 1220, device S 902 and D 903 proceeds to perform directional beam-forming communication in the reserved medium access block 1005 for transferring data packets. As the reservation confirmation is successful, the master device M 901 continues to announce the reservation information in its beacon frames periodically to notify other slave devices in the network, if any. If the reservation confirmation had been unsuccessful, the master device M 901 will stop announcing the reservation in its beacon frames. These steps achieve the process of establishing directional antennas based beam-forming for data transmission in a network.

Figure 14:
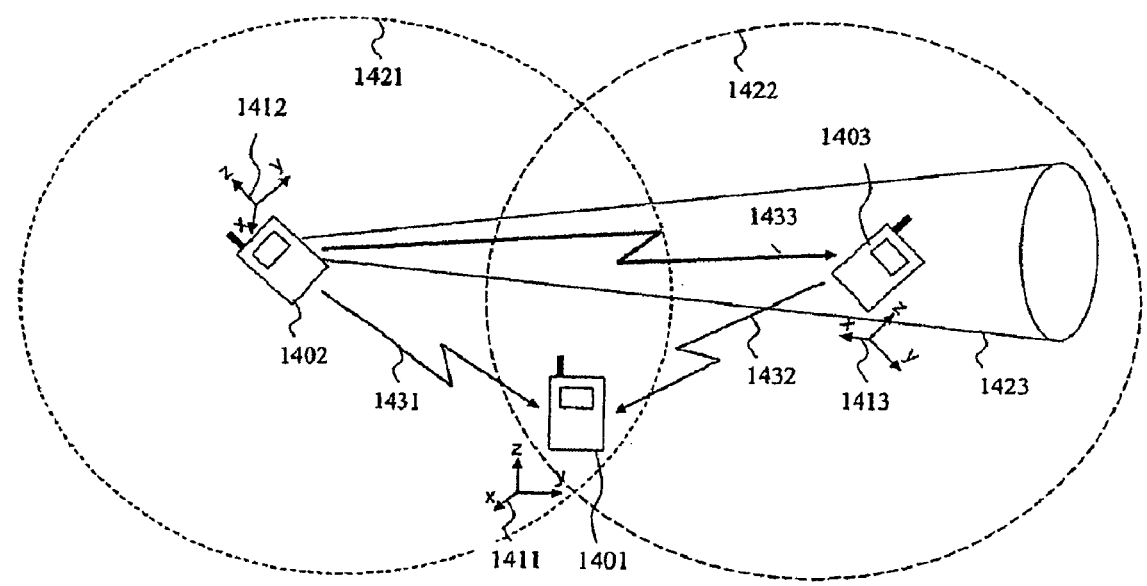
FIG. 14 shows an application of a star topology network from a users' perspective.

FIG. 14 represents an application example of the network shown in FIG. 9. Referring to FIG. 14, there are three mobile wireless communication devices available, namely the master device 1401 and the slave devices 1402, 1403. The first slave device 1402 serves as the source device and the second device serves as the destination device 1403. Initially, 3-D coordinates of device S's 1412, D's 1413 and M's. 1411 are not synchronised. The transmission range of the omni-directional range of device S 1402 and D 1403 are represented by dash-line circles 1421 and 1422 respectively. In the situation represented by FIG. 14, device S 1402 and D 1403 are not able to communicate to each other using omni-directional transmission because they 1402, 1403 are out of each other's transmission range. However, if device S 1402 uses directional beam-forming antenna, the range of the beam-form transmission of device S 1402 is able to enclose the destination device D 1403, which is represented by a solid-line outlined cone 1423. Therefore, device D 1403 can receive device S's 1402 transmission when the above-mentioned technique is employed.

Figure 15:
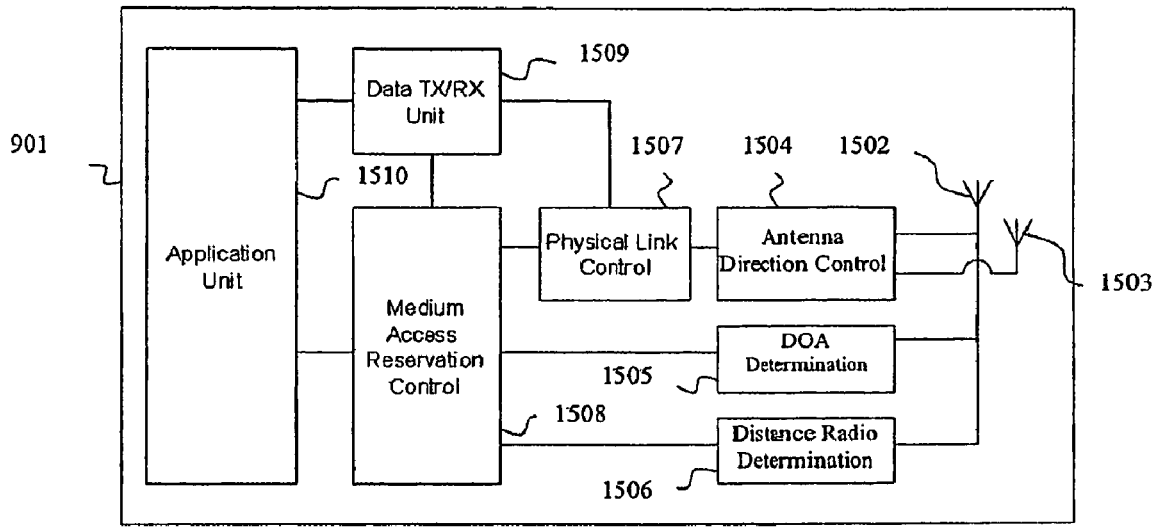
FIG. 15 shows an internal structure of a wireless communication device.

FIG. 15 shows the internal structure of the wireless communication device 1501 for implementing the method and system described. As shown in FIG. 15, the wireless communication device 1501 comprises a directional antenna 1502 to transmit data packets. In addition, there is also an omni-directional antenna 1503 to enable the device 1501 to transmit data packets into the wireless medium omni-directionally. Both antennas 1502, 1503 are connected to an antenna direction control unit 1504 for controlling beam-forming directions of the directional antenna 1502 and selecting between the directional antenna 1502 and omni-directional antenna 1503. In addition, the directional antenna 1502 is connected to a DOA algorithm determination unit 1505 and a distance radio determination unit 1506. The DOA algorithm determination unit 1505 performs calculations to determine the incoming angle of received data packets. The distance ratio determination unit 1506 performs calculations to determine the ratio of the distances of two neighbouring devices away from the master device 1501 in the network. As an alternative, where an external means for determining the distance ratio can be provided, such as an external GPS unit linked to the device 1501, the distance ratio determination unit 1506 is optional.

The distance ratio determination unit 1506 makes use of the strength (power) of received transmission or the packet delay time. The antenna direction control unit 1504 is further connected to a physical link control unit 1507 which is used to perform modulation/demodulation as well as coding/decoding of outgoing and incoming data packets. Both the DOA determination unit 1505 and the distance ratio determination unit 1506 are further connected to a medium access reservation control unit 1508, which is connected to the antenna direction control unit 1504 via a physical link control unit 1507. The physical link control unit 1507 further connects a data TX/RX unit 1509 and the physical link control unit 1507 also connects to the medium access reservation control unit 1508. The data TX/RX unit 1509 provides peer-to-peer data message exchange using the medium access time reserved by the medium access reservation controller unit 1508. Both the data TX/RX unit 1509 and the medium access reservation control unit 1508 are connected to an application unit 1510. Multiple applications of the wireless communication device 1501 are executed by an application unit 1510 connected to both the medium access reservation control unit 1508 and the data TX/RX unit 1509.

An application program for implementing the described method and system is typically supplied to the device 1501 encoded on a data storage medium such as a flash memory carrier or a ROM module (not shown) incorporated in the device 1501.

The described method and system can also be applied to a distributed, ad-hoc network or the like where a common neighbour device exist within omni-directional ranges of both source and destination devices.

In the described method and system, to initiate wireless medium reservation for communication with a destination device using directional beam-forming, a source device of the network first uses omni-directional transmission to inform a common neighbour device (i.e., master device or slave device). The common neighbour device then forwards this information to the destination device omni-directionally. The destination device responses to the common neighbour device omni-directionally, indicating whether it accept or reject such reservation. Through these omni-directional packets exchanged, the common device calculates the relative direction of the source and destination from itself. With the relative direction of the source and destination devices, the common device then calculate a plane (and the plane's normal vector) in 3-D space in which all these 3 devices lie. Next, the common device calculates the relative direction of destination device from the source device and vice versa on this common 3-D plane. Note that in calculating the direction information, the absolute distance of the source and destination device from the common neighbour device is not required so there is no need to perform any range or position measurement relating to distance calibrations. Instead, for example the ratio of the received power from source and destination is used.

After these calculations, the common neighbour device disseminates these calculated relative direction information and normal vector of the common plane to both the source and destination device using a broadcast packet. Upon receiving the disseminated information from the common device, both source and destination device proceed to use the received information align their 3-D X, Y and Z coordinates to be the same as the common device. During an initial period (i.e., omni-directional period) of the reserved medium access time, the source and destination device align their directional antennas toward each other using the disseminated direction information and the source device proceed to send a control packet using directional beam-forming for confirming the reservation. The destination device responses by sending back a response packet. The source device (or alternatively the destination device) informs the common neighbour device whether the reservation confirmation is successful or not using control packet sent omni-directionally. Depending on the result of the reservation, the common neighbour device may continue to announce periodically the presence of the medium access time reservation or stop announcing the presence of reservation. If the reservation is successful, the source and destination device communicate during the reserved medium access time using a directional antenna by beam-forming. From the announcement of the reservation by the common neighbour device, other devices in the vicinity may become aware of the reservation and hence, reduce "device deafness" situation.

Figure 16:
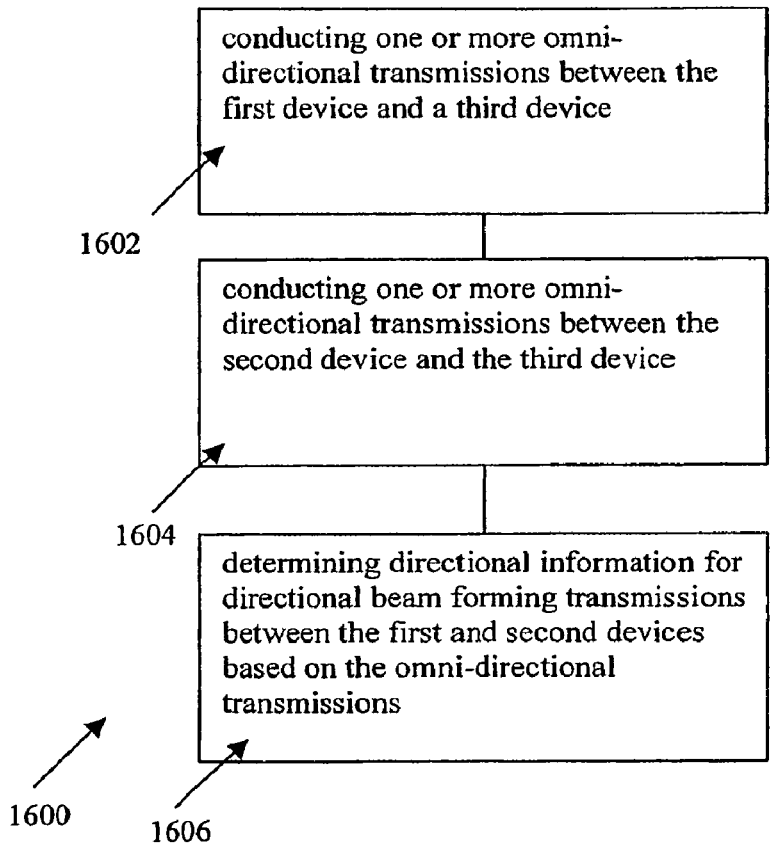
FIG. 16 is a flowchart illustrating a method for wireless directional beam-forming transmission between a first device and a second device.

FIG. 16 is a flowchart 1600 illustrating a method for wireless directional beam-forming transmission between a first device and a second device. At step 1602, one or more omni-directional transmissions between the first device and a third device is conducted. At step 1604, one or more omni-directional transmissions between the second device and the third device is conducted. At step 1606, directional information for directional beam forming transmissions between the first and second devices is determined based on the omni-directional transmissions.

Figure 17:
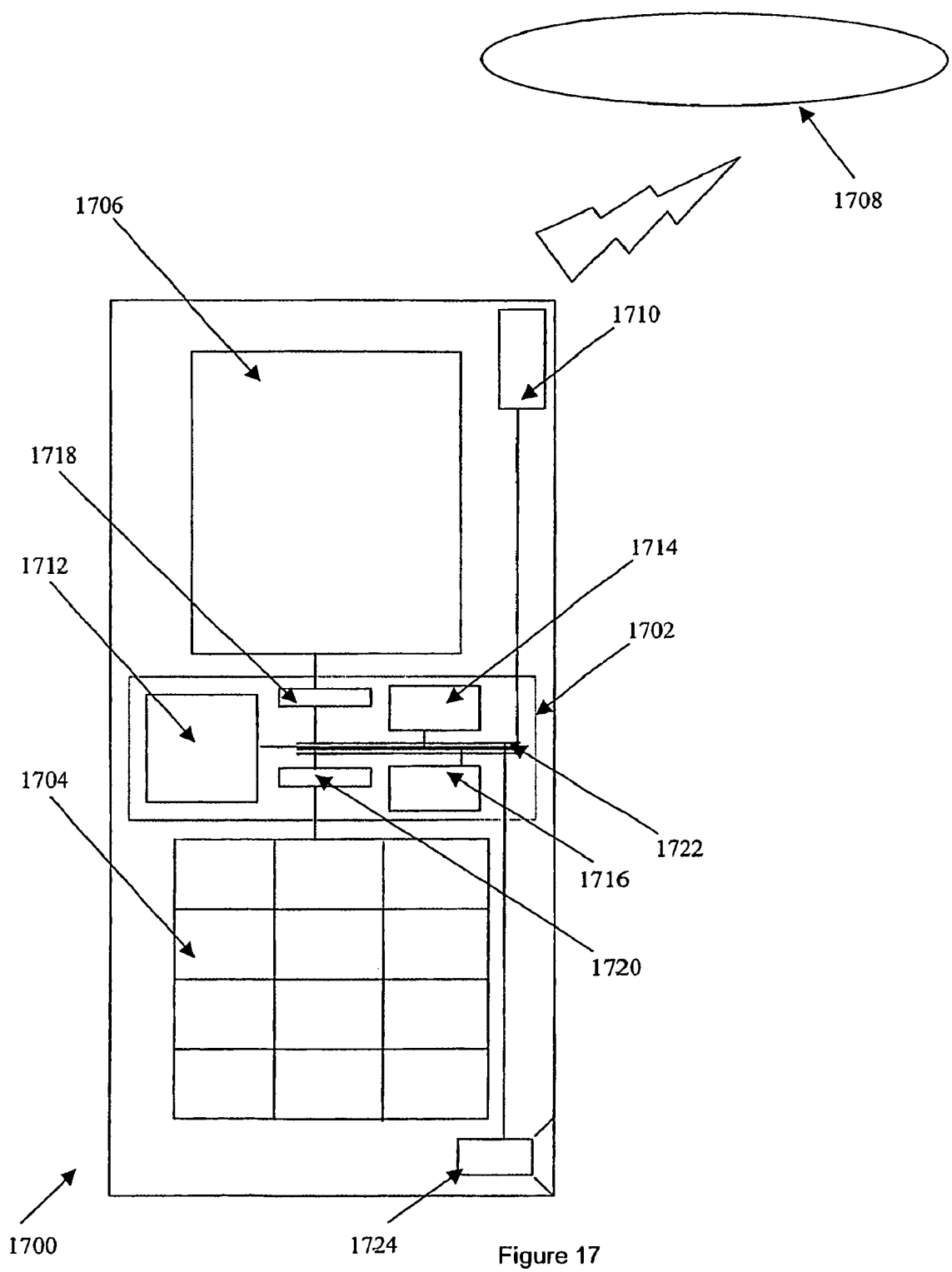
FIG. 17 is a schematic illustration of a wireless device for implementing a method of wireless directional beam-forming transmission.

The method of the current arrangement can be implemented on a wireless device 1700, schematically shown in FIG. 17. It may be implemented as software, such as a computer program being executed within the wireless device 1700, and instructing the wireless device 1700 to conduct the method.

The wireless device 1700 comprises a processor module 1702, an input module such as a keypad 1704 and an output module such as a display 1706.

The processor module 1702 is connected to a wireless network 1708 via a suitable transceiver device 1710, to enable wireless communication and/or access to e.g. the Internet or other network systems such as Local Area Network (LAN), Wireless Personal Area Network (WPAN) or Wide Area Network (WAN).

The processor module 1702 in the example includes a processor 1712, a Random Access Memory (RAM) 1714 and a Read Only Memory (ROM) 1716. The processor module 1702 also includes a number of Input/Output (I/O) interfaces, for example I/O interface 1718 to the display 1706, and I/O interface 1720 to the keypad 1704.

The components of the processor module 1702 typically communicate via an interconnected bus 1722 and in a manner known to the person skilled in the relevant art.

The application program is typically supplied to the user of the wireless device 1700 encoded on a data storage medium such as a flash memory module or memory card/stick and read utilising a corresponding memory reader-writer of a data storage device 1724. The application program is read and controlled in its execution by the processor 1712. Intermediate storage of program data may be accomplished using RAM 1714.

In the described methods and systems, the range limitation problem of omni-directional antennas in a network is addressed and the network has improved its spatial re-use by providing directional beam-forming. To do so, relative directions of transmitter and receiver devices are determined without the need to equip any external equipment to the devices for providing such information. Furthermore, no constant ranging, locating or coordinates synchronising is necessary and devices in the network do not need to have the capability to calibrate and measure absolute ranges or locations of peer devices.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The disclosure of Singapore Patent Application No. 200602663-7 filed on Apr. 20, 2006 including the specification, drawings and abstract is incorporated herein by reference in its entirety.

The invention claimed is:

1. A method of wireless directional beam-forming transmission between a first device and a second device, the method comprising the steps of:
    conducting one or more first omni-directional transmissions between the first device and a third device;
    conducting one or more second omni-directional transmissions between the second device and the third device; and
    determining directional information for directional beam-forming transmissions between the first and second devices based on the first and second omni-directional transmissions,
    wherein the step of determining the directional information comprises a step of determining, at the third device, fifth and sixth directions of arrival for the first and second devices, respectively, of the directional beam-forming transmissions between the first and second devices with respect to a reference direction of the third device; and
    the step of determining the fifth and sixth directions of arrival comprises a step of determining a ratio of a distance between the first device and the third device to a distance between the second device and the third device.

2. The method as claimed in claim 1, wherein the step of determining the directional information comprises a step of determining, at the third device, a first direction of arrival of one of the first omni-directional transmissions from the first device with respect to a first reference direction of the third device.

3. The method as claimed in claim 2, wherein the step of determining the directional information further comprises a step of determining, at the first device, a third direction of arrival of a third omni-directional transmission from the third device with respect to a third reference direction of the first device, and an angular displacement between the first and third reference directions of the third and first devices, respectively, based on the first direction of arrival and the third direction of arrival.

4. The method as claimed in claim 1, wherein the step of determining the directional information comprises a step of determining, at the third device, a second direction of arrival of one of the second omni-directional transmissions from the second device with respect to a second reference direction of the third device.

5. The method as claimed in claim 4, wherein the step of determining the directional information further comprises a step of determining, at the second device, a fourth direction of arrival of a fourth omni-directional transmission from the third device with respect to a fourth reference direction of the second device, and an angular displacement between the second and fourth reference directions of the third and second devices, respectively, based on the second direction of arrival and the fourth direction of arrival.

6. The method as claimed in claim 1, wherein the ratio is determined based on transmission power of the first and second omnidirectional transmissions received at the third device, 7. The method as claimed in claim 1, wherein the ratio is determined based on transmission delays of the first and second omni-directional transmissions received at the third device.

8. The method as claimed in claim 1, further comprising a step of determining 3-dimensional directional information for the directional beam-forming transmissions between the first and second devices based on the first and second omni-directional transmissions.

9. The method as claimed in claim 8, wherein the step of determining the 3-dimensional directional information comprises a step of determining, at the third device, a first azimuthal direction of arrival and a first elevational direction of arrival of one of the first omni-directional transmissions from the first device with respect to a first 3-dimensional reference space of the third device.

10. The method as claimed in claim 8, wherein the step of determining the directional information comprises a step of determining, at the third device, a second azimuthal direction of arrival and a second elevational direction of arrival of one of the second omni-directional transmissions from the second device with respect to a second 3-dimensional reference space of the third device.

11. The method as claimed in claim 9, further comprising a step of determining, at the third device, a unit direction vector with respect to a third 3-dimensional reference space of the third device from the third device towards the first device based on the first azimuthal and first elevational directions of arrival.

12. The method as claimed in claim 10, further comprising a step of determining, at the third device, a unit direction vector with respect to a fourth 3-dimensional reference space of the third device from the third device towards the second device based on the second azimuthal and second elevational directions of arrival.

13. The method as claimed in claim 8, further comprising a step of determining, at the third device, a normalized normal vector with respect to a 3-dimensional reference space of the third device of a plane in which the first, second, and third devices reside.

14. The method as claimed in claim 13, further comprising a step of determining, at the third device, angles of a triangle formed by the first, second, and third devices in said plane.

15. The method as claimed in claim 13, further comprising a step of aligning, at the first and second devices, the 3-dimensional reference space of the third device with 3-dimensional reference spaces of the first and second devices, respectively.

16. The method as claimed in claim 15, wherein the first device aligns the 3-dimensional reference spaces of the first and second devices based on a first azimuthal and a first elevational direction of arrival received from the third device, and a third azimuthal and a third elevational direction of arrival of one of the first omni-directional transmissions from the third device with respect to the 3-dimensional reference space of the first device.

17. The method as claimed in claim 15, wherein the second device aligns the 3-dimensional reference spaces of the first and second devices based on a second azimuthal and a second elevational direction of arrival received from the third device, and a fourth azimuthal and a fourth elevational direction of arrival of one of the second omni-directional transmissions from the third device with respect to the 3-dimensional reference space of the second device.

18. The method as claimed in claim 1, wherein the first device, the second device and the third device each communicates using MAC-based communications, wherein a medium access time is partitioned for the first and second omni-directional transmissions in a first portion, and for the directional beam-forming transmissions or the first and second omni-directional transmissions in a second portion.

19. The method as claimed in claim 18, further comprising a step of broadcasting a medium access reservation period, reserved for the directional beam-forming transmissions between the first and second devices, within the second portion of the medium access time by the first and second omni-directional transmissions.

20. The method as claimed in claim 1, further comprising a step of transmitting a request for directional beam-forming transmission reservation from the first device to the second device, indirectly through the third device, wherein the request is transmitted by the first and second omni-directional transmissions.

21. The method as claimed in claim 20, further comprising a step of confirming, from the first device, the second device or both the first device and the second device, the directional beam-forming transmission reservation to the third device using the first and second omni-directional transmissions.

22. A method of wireless directional beam-forming transmission between a first device and a second device, the method comprising the steps of:
conducting one or more first omni-directional transmissions between the first device and a third device;
conducting one or more second omni-directional transmissions between the second device and the third device;
determining directional information for directional beam-forming transmissions between the first and second devices based on the first and second omni-directional transmissions;
determining 3-dimensional directional information for the directional beam-forming transmissions between the first and second devices based on the first and second omni-directional transmissions;
determining, at the third device, a normalized normal vector with respect to a 3-dimensional reference space of the third device of a plane in which the first, second and third devices reside; and
determining, at the third device, angles of a triangle formed by the first, second, and third devices in the plane,
wherein the step of determining the angles of the triangle comprises a step of determining a ratio of a distance between the third device and the first device to a distance between the third device and the second device.

23. The method as claimed in claim 22, wherein the ratio is determined based on transmission power of the first and second omni-directional transmissions received at the third device from the first and second devices, respectively.

24. The method as claimed in claim 22, wherein the ratio is determined based on transmission delays of the first and second omni-directional transmissions received at the third device from the first and second devices, respectively.

25. A wireless communication device comprising:
a transmitter for transmitting one or more first omni-directional transmissions to an intermediate device;
a receiver for receiving directional information from the intermediate device for directional beam forming transmissions to a destination device; and
a processor for generating additional directional information based on the received directional information, wherein:
the transmitter conducts the directional beam-forming transmissions to the destination device based on the directional information received from the intermediate device and the additional directional information;
a transmission distance of the directional beam-forming transmissions is longer than a transmission distance of the one or more first omni-directional transmissions;
the destination device transmits a second omni-directional transmission to the intermediate device;
the intermediate device determines the directional information for the directional beam-forming transmissions between the wireless communication device and the destination device based on the first and second omni-directional transmissions;
the operation of determining the directional information comprises determining, at the intermediate device, a direction of arrival at the destination device of the directional beam-forming transmissions with respect to a reference direction of the intermediate device; and
determining the direction of arrival of the directional beam-forming transmissions comprises determining a ratio of a distance between the wireless communication device and the intermediate device to a distance between the destination device and the intermediate device.

26. A wireless communication device comprising:
a receiver for receiving one or more first omni-directional transmissions from a source device and a destination device;
a transmitter for transmitting one or more second omni-directional transmissions to the source device and the destination device; and
a processor for generating directional information for directional beam-forming transmissions between the source device and the destination device based on the first omni-directional transmissions received by the receiver, wherein:
the transmitter transmits the directional information to the source device and the destination device using one or more of the second omni-directional transmissions;
a transmission distance of the directional beam-forming transmissions is longer than a transmission distance of the first omni-directional transmissions and a transmission distance of the second omni-directional transmissions;
the processor determines the directional information for the directional beam-forming transmissions based on the first omni-directional transmissions;
the operation of determining the directional information comprises determining a direction of arrival at the destination device of the directional beam-forming transmissions with respect to a reference direction of the wireless communication device; and
determining the direction of arrival of the directional beam-forming transmissions comprises determining a ratio of a distance between the source device and the wireless communication device to a distance between the destination device and the wireless communication device.

27. A non-transitory data storage medium having stored thereon code to instruct a wireless communication device to execute a method for directional beam-forming transmission, the method comprising the steps of:
transmitting one or more first omni-directional transmissions to an intermediate device;
receiving directional information from the intermediate device for directional beam-forming transmissions to a destination device;
generating additional directional information based on the received directional information; and
conducting the directional beam-forming transmissions to the destination device based on the directional information received from the intermediate device and the additional directional information, wherein:
a transmission distance of the directional beam-forming transmissions is longer than a transmission distance of the one or more first omni-directional transmissions;
the destination device transmits a second omni-directional transmission to the intermediate device;
the intermediate device determines the directional information for the directional beam-forming transmissions between the wireless communication device and the destination device based on the first and second omni-directional transmissions;
the operation of determining the directional information comprises determining, at the intermediate device, a direction of arrival at the destination device of the directional beam-forming transmissions with respect to a reference direction of the intermediate device; and
determining the direction of arrival of the directional beam-forming transmissions comprises determining a ratio of a distance between the wireless communication device and the intermediate device to a distance between the destination device and the intermediate device.

28. A non-transitory data storage medium having stored thereon code to instruct a wireless communication device to execute a method for directional beam-forming transmission, the method comprising the steps of:
receiving one or more first omni-directional transmissions from a source device;
transmitting one or more second omni-directional transmissions to a destination device;
receiving one or more third omni-directional transmissions from the destination device;
generating directional information for directional beam-forming transmissions between the source device and the destination device; and
transmitting the directional information to the source device and the destination device using one or more fourth omni-directional transmissions, wherein:
a transmission distance of the directional beam-forming transmissions is longer than respective transmission distances of the first, second, third and fourth omni-directional transmissions;
the wireless communication device determines the directional information for the directional beam-forming transmissions based on the first and third omni-directional transmissions;
the operation of determining the directional information comprises determining a direction of arrival at the destination device of the directional beam-forming transmissions with respect to a reference direction of the wireless communication device; and determining the direction of arrival of the directional beam-forming transmissions comprises determining a ratio of a distance between the source device and the wireless communication device to a distance between the destination device and the wireless communication device.

* * * * *

UNITED STATES PATENT AND TRADEMARK OFFICE
CERTIFICATE OF CORRECTION

| | |
|---|---|
| PATENT NO. | : 8,054,225 B2 |
| APPLICATION NO. | : 12/297626 |
| DATED | : November 8, 2011 |
| INVENTOR(S) | : Hong Sim et al. |

It is certified that error appears in the above-identified patent and that said Letters Patent is hereby corrected as shown below:

Claim 6, column 21, line 19, incorrectly reads:

"device,"

and should read:

"device."

Signed and Sealed this
Nineteenth Day of June, 2012

David J. Kappos
*Director of the United States Patent and Trademark Office*